Figure 1:
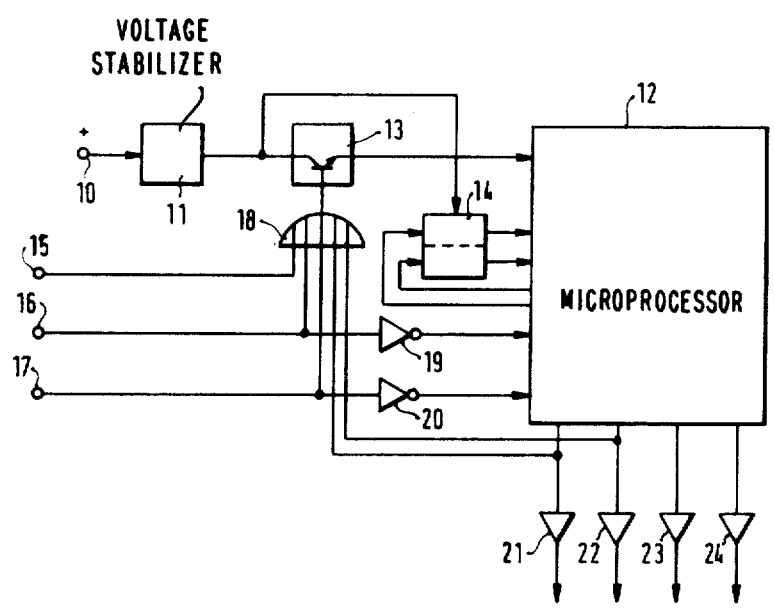

United States Patent [19]

Wesemeyer et al.

[11] 4,455,623

[45] Jun. 19, 1984

[54] APPARATUS FOR DECREASING CURRENT CONSUMPTION OF MICROPROCESSORS IN BATTERY-ENERGIZED SYSTEMS

[75] Inventors: Jurgen Wesemeyer, Nuremberg; Lothar Haas, Stein; Georg Haubner, Berg, all of Fed. Rep. of Germany

[73] Assignee: Robert Bosch GmbH, Stuttgart, Fed. Rep. of Germany

[21] Appl. No.: 383,956

[22] Filed: Jun. 1, 1982

Related U.S. Application Data

[63] Continuation of Ser. No. 124,476, Feb. 25, 1980, abandoned.

[30] Foreign Application Priority Data

Mar. 27, 1979 [DE] Fed. Rep. of Germany ....... 2911998

[51] Int. Cl.³ .............................................. G06F 1/00
[52] U.S. Cl. .................................... 364/900; 364/707
[58] Field of Search ... 364/200 MS File, 900 MS File, 364/707

[56] References Cited

U.S. PATENT DOCUMENTS

| | | | |
|---|---|---|---|
| 3,813,649 | 5/1974 | Struger | 364/900 |
| 3,941,989 | 3/1976 | McLaughlin | 364/900 |
| 4,099,495 | 7/1978 | Kiewcke | 123/417 |
| 4,158,230 | 6/1979 | Washizuka | 364/708 |
| 4,201,159 | 5/1980 | Kawai | 123/417 |
| 4,279,020 | 7/1981 | Christian | 364/900 |

*Primary Examiner*—Harvey E. Springborn
*Assistant Examiner*—David Y. Eng
*Attorney, Agent, or Firm*—Frishauf, Holtz, Goodman & Woodward

[57] ABSTRACT

The current consumption of a microprocessor is decreased by a switch which connects it to the electrical supply only when a control signal is received which indicates that the microprocessor is to execute a program. Specifically, an electronic switch such as a transistor is switched to the nonconductive state unless a control signal is received. For programs whose execution time is greater than the duration of the control signal, the microprocessor supplies a signal to the switch keeping it in the conductive state until the program has been fully executed.

4 Claims, 2 Drawing Figures ically carried out, that is even following the
APPARATUS FOR DECREASING CURRENT CONSUMPTION OF MICROPROCESSORS IN BATTERY-ENERGIZED SYSTEMS This is a continuation of application Ser. No. 124,476 filed Feb. 25, 1980 now abandoned.

The present invention relates to systems for decreasing the current consumption of microprocessors. In particular, it is concerned with microprocessors in battery-energized systems such as is the case in automobiles.

BACKGROUND AND PRIOR ART

In known systems, the supply of current to a microprocessor which controls various functions in an automobile may never be totally interrupted, since the microprocessor controls functions as, for example, the alarm system of the vehicle or electrical door-locking devices. Since microprocessors draw much more curent than CMOS building blocks and may draw, for example, 50 to 60 mA, use of a microprocessor would cause the battery to be discharged within a few days if the vehicle is not driven and therefore no recharging occurs.

THE INVENTION

It is an object of the present invention to furnish an electrical supply for a microprocessor which allows the microprocessor to function at any time and which still prevents a discharge of the battery even if the vehicle is not driven for extended time periods. In accordance with the present invention, a switch is provided which interrupts the supply of current to the microprocessor when open, but is closed in response to at least one control signal. The control signals may be supplied cyclically or only upon demand. For specific functions, the control signals have a relatively short duration and the microprocessor is connected to the current source by means of a signal at one of its outputs until the associated program has been completed.

DRAWINGS ILLUSTRATING A PREFERRED EMBODIMENT

Figure 2:
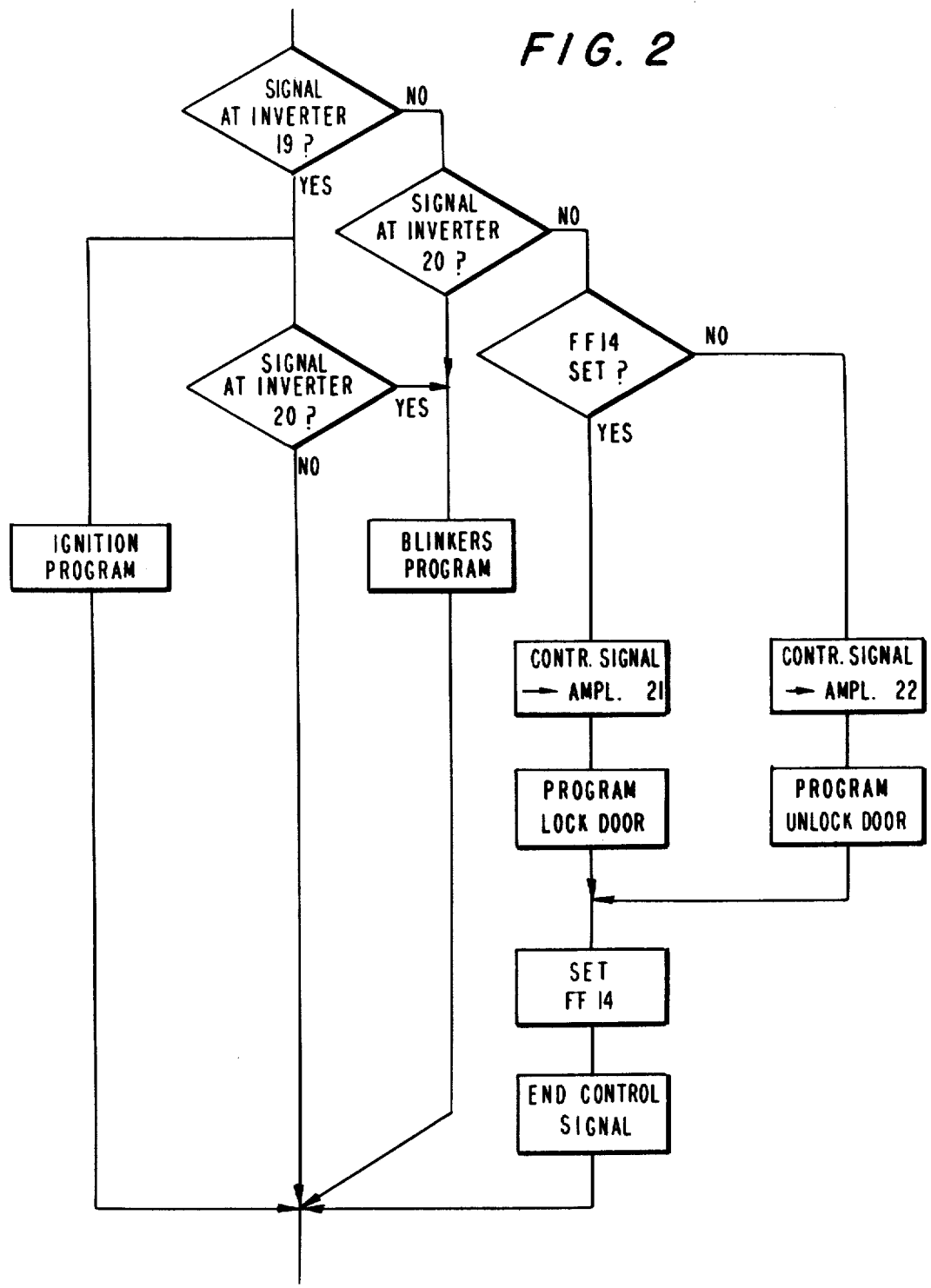

FIG. 1 is a schematic diagram illustrating the microprocessor controlled energization circuit of the present invention; and FIG. 2 is a flow chart for the microprocessor of FIG. 1.

In FIG. 1, reference numeral 10 designages a terminal which is connected to the source of electrical energy, e.g. the battery. Terminal 10 is connected to the input of a known voltage stabilization circuit 11 whose output is connected to microprocessor 12 through the emitter-collector circuit of a transistor 13. Transistor 13 is only on possible embodiment of an electronic switch which connects and disconnects microprocessor 12 from the supply voltage when in a conductive and nonconductive state, respectively. The voltage supplied through switch 13 can also be applied to other components (ROM, RAM, input/output unit, clock frequency generator) of the microcomputer of which microprocessor 12 is one component.

The output of voltage stabiliation circuit 11 further is connected to a flip-flop 14 whose other input is connected to an output of microprocessor 12 and both of whose outputs are also connected to microprocessor 12.

Three input terminals 15–17 are connected to the control input (base) of switch 13 through an OR gate 18. Terminals 16 and 17 are also connected through inverters 19 and 20, respectively, to inputs of microprocessor 12. Output amplifiers 21, 22, 23 and 24 are connected to four separate outputs of microprocessor 12. The output of the amplifiers is connected to various loads whose operation is to be controlled by signals applied to terminals 15–17. The outputs of microprocessor 12 which are connected to amplifiers 21 and 22 are also connected to further inputs of OR gate 18.

OPERATION

Transistor 13 is normally in the blocked state so that no current is drawn by microprocessor 12. If now a control signal is applied to one of terminals 16 and 17, e.g. control signal for starting the ignition or for activating warning blinkers, then switch 13 is switched to the conductive state for the duration of the control signal via OR gate 18, so that a stabilized voltage is applied to microprocessor 12. Microprocessor 12 then carries out the program corresponding to the applied control signal. Which program is to be carried out is determined by interrogation of inverters 19 and 20. The number of inverters to be interrogated can be one less than the number of possible control signals i.e. possible programs. These inverters are used to suppress noise and, in principle, may be omitted. Depending upon the called out program, microprocessor 12 generates signals at outputs 23 and 24 which are associated with inputs 16 and 17. If, for example, an ignition control signal is applied at terminal 16, cyclical ignition signals controlled in dependence upon the engine speed and other parameters would be generated at terminal 23, while in the case of a warning blinker control signal at terminal 17, periodically blinking pulses would be generated at output terminal 24. The values of the other parameters required to determine the ignition frequency, etc. are applied to microprocessor 12. This is not illustrated here. When the control signal at one of terminals 16, 17 ceases, switch 13 is switched back to the blocked state and no voltage is applied to microprocessor 12.

Control signals of very short duration can be applied to terminal 15, for example control signals for locking the doors as well as for unlocking the doors, for energizing the alarm device or other functions whose duration is fixed and independent of the duration of the control signal. For such functions, voltage must continue to be applied to the microprocessor until the program has been completely carried out, that is even following the end of the control signal. In order to effect this function, switch 13 is kept in the conductive state via OR gate 18 and signals are applied to the output terminals of microprocessor 12 which are connected to amplifiers 21 and 22 until such time as the complete program has been executed. Since there is no memory in the microprocessor when it is first energized, the outputs of flip-flop 14 must be interrogated to find out whether the desired function is locking (e.g. via amplifier 21) or unlocking (e.g. via amplifier 22). After the command has been executed, flip-flop 14 is reset by microprocessor 12, so that the microprocessor will be able to recognize the state of the locks after it has been de-energized and then re-energized. The interrogation of this flip-flop is part of the program. Other storage devices, for example a RAM, may be substituted for the flip-flop.

If the command is to be executed following some delay, as may be the case for an alarm device, then switch 13 may be kept in the conductive state by the signal applied at one output of microprocessor 12, while a signal at the other output causes the control function to be executed after a delay. In all cases in which the original command is not to executed immediately, transistor 13 must be kept in the conductive state through a separate output of microprocessor 12. After the command has been executed, the program is ended and switch 13 is again blocked.

The above-described operation is shown in greater detail in the flow chart of FIG. 2. It must be remembered that a signal at any one of terminals 15–17 causes supply voltage to be applied to microprocessor 12 via transistor 13. The program can then start. If a signal is present at inverter 19, the ignition program is started. If, in addition, a signal is present at inverter 20, the warning blinker program is also initiated. When these programs have ended, the overall program recommences with an interrogation of inverters 19 and 20. In the absence of the signals, the program is stopped immediately since current is no longer supplied to the microprocessor. Usually, e.g. the ignition program signal at inverter 19 is present throughout the time the vehicle is in operation, so that the ignition program is repeating during this time.

If switch 13 has been closed due to the appearance of a signal at terminal 15 and microprocessor 12 is thus energized, but no signal appears at either inverters 19 or 20, flip-flop 14 is interrogated. If flip-flop 14 is set, a control signal is applied to amplifier 21. This control signal causes the energy supplied to the microprocessor to be maintained through OR gate 18 even afte the signals applied at terminal 15 has ended. Further, the door-locking program is initiated which causes a control current locking the door to be generated. If flip-flop 14 is not set, a control signal is applied to amplifier 22 which also causes the current supply to microprocessor 12 to be maintained following the end of the signal at terminal 15. However, in this case, the program to unlock the door is initiated. At the end of either the door-locking program or the door-unlocking program, the flip-flop 14 is reset so tha the next time that a signal appears at terminal 15 the opposite process will take place. Finally, the control signal applied either to amplifier 21 or amplifier 22 is discontinued so that the microprocessor is again disconnected from its current supply.

The above-described system is not to be limited to the particular functions illustrated, since any function may be included which is controllable by means of a microprocessor.

Various changes and modifications may be made within the scope of the inventive concepts.

We claim:

1. A system for economically operating a microprocessor for performing at least one task of a first class requiring a minimum decoding time and a plurality of tasks of a second class permitting a decoding time substantially greater than said minimum decoding time, comprising:

electrical power supply means (10, 11) for supplying power to said microprocessor (12);

electrically controllable switch means (13) having a path controlled thereby which is interposed between said power supply means (10, 11) and said microprocessor (12);

an OR circuit (18) having its output connected for controlling said switch means (13) to connect said power supply means (10, 11) to said microprocessor (12) during the presence of a signal at any one of several inputs of said OR circuit (18), said inputs including a first input (15) for receiving signals designating requests for performance of a task of said first class, a plurality of second inputs (19, 20) for receiving signals designating requests for performance of a task of said second class, said second inputs but not said first input being connected to an input port of said microprocessor (12) for task designation decoding and monitoring by said microprocessor, and a plurality of third inputs connected respectively to a plurality of first task performance controlling outputs (21, 22) of said microprocessor, which are related to the performance of ongoing tasks of said microprocessor respectively requested through signals at said input port thereof, said microprocessor also having a plurality of second task performance controlling outputs not connected to said OR circuit, and a plural-state circuit (14) settable by control inputs thereof for indicating which of a plurality of tasks of said first class is being initiated when an input appears at said first input (15) of said OR circuit, whereby said tasks of said first class are performable only when said tasks of said second class are not being performed and are then performable quickly with the shortest possible duration of on-time of said switch means (13).

2. A system according to claim 1 in which said connection of said third inputs of said OR circuit to said microprocessor outputs provides a signal through the output of said OR circuit for maintaining the connection of said power supply means to said microprocessor through said switch means throughout the execution of a program of said microprocessor.

3. A system according to claim 1 in which said plural-state circuit (14) is connected to said power supply means for preservation of a state of said plural-state circuit while said microprocessor is disconnected from said power supply means by said switch means.

4. A system according to claim 3 in which said control inputs of said plural-state circuit (14) are connected to outputs of said microprocessor.

* * * * *